US006772129B2

(12) United States Patent
Alvarez et al.

(10) Patent No.: US 6,772,129 B2
(45) Date of Patent: Aug. 3, 2004

(54) SYSTEM AND METHOD FOR DETERMINING THE EFFECTIVENESS AND EFFICIENCY OF ADVERTISING MEDIA

(75) Inventors: Alan P. Alvarez, Valhalla, NY (US); Sean C. Rice, Valhalla, NY (US)

(73) Assignee: Planning Power Service, Inc., Valhalla, NY (US)

(*) Notice: Subject to any disclaimer, the term of this patent is extended or adjusted under 35 U.S.C. 154(b) by 0 days.

(21) Appl. No.: 10/234,361

(22) Filed: Sep. 4, 2002

(65) Prior Publication Data

US 2003/0078832 A1 Apr. 24, 2003

Related U.S. Application Data

(60) Provisional application No. 60/317,351, filed on Sep. 4, 2001.

(51) Int. Cl.[7] .............................................. G06F 17/60
(52) U.S. Cl. ....................................................... 705/14
(58) Field of Search ..................................... 705/10, 14

(56) References Cited

U.S. PATENT DOCUMENTS

| 6,029,176 | A | * | 2/2000 | Cannon | .................... | 707/104.1 |
| 6,286,005 | B1 | * | 9/2001 | Cannon | ....................... | 707/100 |
| 2002/0144262 | A1 | * | 10/2002 | Plotnick et al. | ................ | 725/32 |

FOREIGN PATENT DOCUMENTS

WO      WO 99/46719 A1 * 9/1999   ........... G06F/19/00

OTHER PUBLICATIONS

Cannon, Hugh M. & Edward A. Riordan. "Effective Reach and Frequency: Does it Really Make Sense?" Journal of Advertising Research, vol. 34, No. 2, p. 19(10), Mar.–Apr. 1994.*
"Honomichl Top Fifty '99." Marketing News, vol. 33, No. 12, p. H1(2), Jun. 7, 1999.*
Weiss et al. "The Effects of Serial Correlation and Data Aggregation on Advertising Measurement." Journal of Marketing Research, vol. 20, No. 3, pp. 268–279, Aug. 1983.*
Bowen–Jones, Carys. "Advertising: Cost and Effect." Marketing, pp. 17–21, Mar. 31, 1988.*
Blair, Margaret & John Philip Jones. "Examining 'Conventional Wisdoms' About Advertising Effects With Evidence From Independent Sources (Part 1 of 4)." Journal of Advertising Research, vol. 36, No. 6, pp. 37–42, Nov. 1996.*
"DoubleClick and NetGenesis Announce Strategic Reseller Agreement." M2 Presswire, p. 1, Apr. 4, 2000.*

* cited by examiner

Primary Examiner—Susanna Meinecke-Díaz
(74) Attorney, Agent, or Firm—Wildman, Harrold, Allen & Dixon LLP

(57) ABSTRACT

A method for determining the relationship between historical media support levels, media cost or spending, product pricing and product sales that provides the relative effectiveness and efficiency of a specific form of media at both a macro and micro level, as well as an understanding of media half-life and media saturation points. This method measures all known forms of media such as the commonly used media of television, radio and newspaper, as well as new forms of media advertising such as internet banners and email along with lesser used media like sides of buildings and taxi tops.

25 Claims, 3 Drawing Sheets

SYSTEM AND METHOD FOR DETERMINING THE EFFECTIVENESS AND EFFICIENCY OF ADVERTISING MEDIA

CROSS REFERENCE TO RELATED APPLICATION

This application claims the priority of U.S. Provisional patent application serial No. 60/317,351 filed Sep. 4, 2001.

FIELD

This invention relates to measuring the impact of advertising on sales and profit in general, and in particular, to measuring the return on investment for specific types of advertising.

BACKGROUND

Media planners typically measure the effectiveness of delivery of a message to an audience to help them create future media plans. Often this effectiveness is quantified as the number of people that saw a particular advertisement in a given media. While this information can be useful, the ultimate measure of success for a media plan is the sales and profit that the plan generates.

Conventional methodologies for measuring sales and profits generated by advertisement, however, are extremely expensive and time consuming, and thus are nearly impossible to widely implement. Accordingly, what is needed is a quick, affordable, and accurate way to measure of the effectiveness and efficiency of an advertising media on sales and profits.

SUMMARY

Pursuant to the present application, shortcomings of the existing art are overcome and additional advantages are provided through the provision of a system and method for determining the effectiveness and efficiency of advertising media.

In one example, a method is provided for determining the effect of an advertisement on profits generated by sales of a product advertised in a given market area over a particular period of time. A total of the number of impressions an advertisement makes on a plurality of potential customers through at least one specific form of advertising is compiled. At least one reduction rate is established for each of the total number of impressions for the at least one specific form of advertising. The at least one reduction rate variable for the at least one specific form of advertising is correlated with product sales. At least one correlation variable for the at least one specific form of advertising is determined. At least one saturation curve variable for the at least one specific form of advertising is calculated. The at least one saturation curve variable is correlated with product sales. A first regression coefficient is determined for the at least one specific form of advertising. A second regression coefficient is determined for the at least one specific form of advertising. The first and second regression coefficients are averaged for the at least one specific form of advertising to obtain an average coefficient for the at least one specific form of advertising. The product sales per impression are then calculated using the average coefficient for the at least one specific form of advertising.

In another example, a data processing system is provided for determining the effect of an advertisement on profits generated by sales of a product advertised in a given market area over a particular period of time. The data processing system includes computer code having an effectiveness and efficiency calculation component for calculating a total number of product sales resulting from an advertising impression.

In another example, a computer-readable medium is provided which includes computer-executable instructions for performing a method which comprises compiling a total number of impressions an advertisement makes on a plurality of potential customers through at least one specific form of advertising; establishing a reduction rate for each of the total number of impressions for the at least one specific form of advertising; determining at least one correlation variable for the at least one specific form of advertising; calculating at least one saturation curve variable for the at least one specific form of advertising; correlating the at least one saturation curve variable with product sales; determining a first regression coefficient for the at least one specific form of advertising; determining a second regression coefficient; averaging the first and second regression coefficients for each specific form of advertising to obtain an average coefficient for each specific form of advertising; and calculating the product sales per impression using the average coefficient for each specific form of advertising.

DETAILED DESCRIPTION

Figure 1:
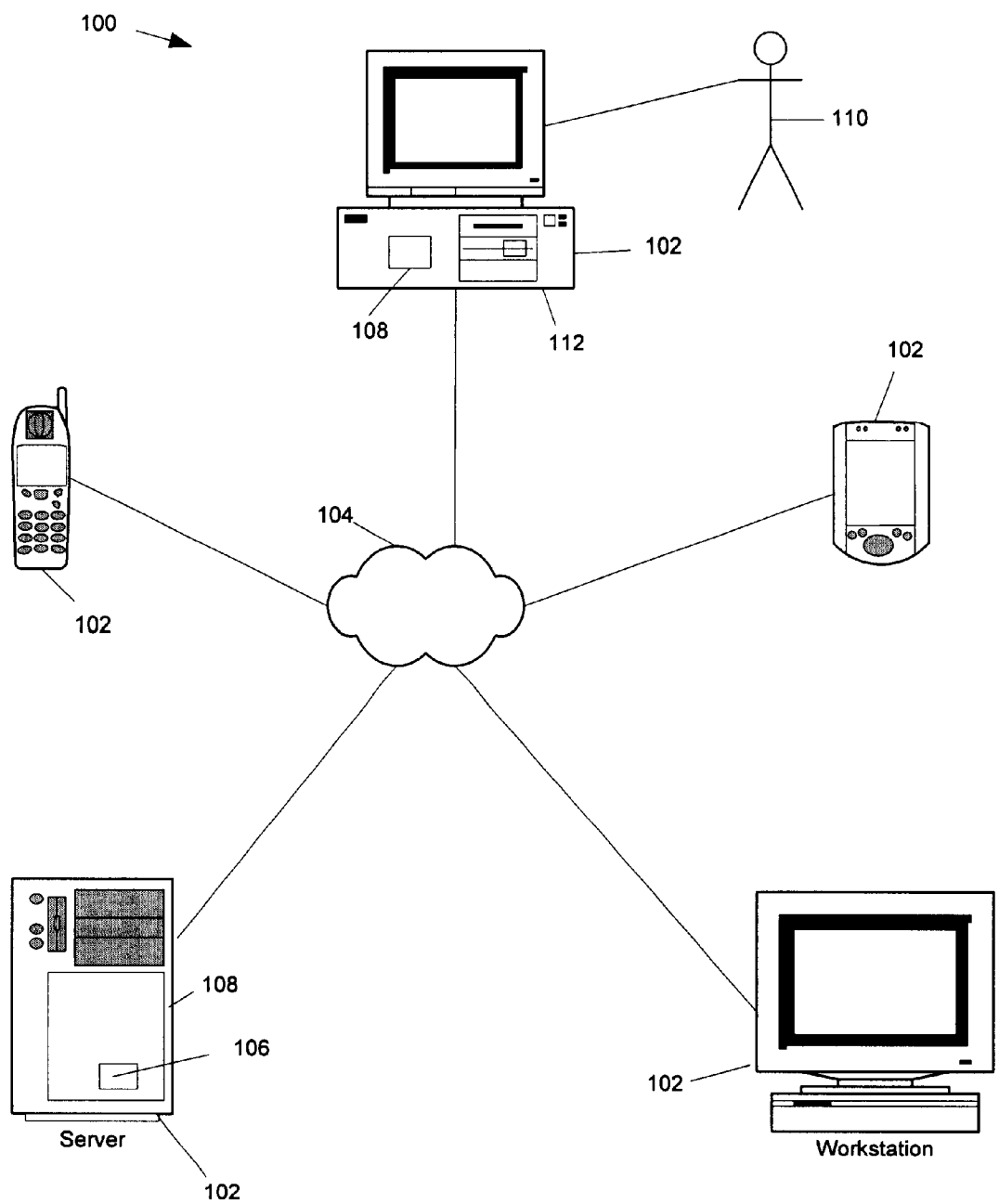
FIG. 1 is a functional block diagram depicting an exemplary system for determining the effectiveness and efficiency of advertising media.

Referring to FIG. 1, system 100, in one example, includes a plurality of components such as computer software and/or hardware components. A number of such components can be combined or divided in one example of system 100. System 100 in one example employs at least one computer-readable signal-bearing medium. One example of a computer-readable signal-bearing medium for system 100 comprises a recordable data storage medium such as a magnetic, optical, and/or atomic data storage medium. In another example, a computer-readable signal-bearing medium for system 100 comprises a modulated carrier signal transmitted over a network comprising or coupled with system 100, for instance, a telephone network, a local area network ("LAN"), the Internet, and/or a wireless network. An exemplary component of system 100 employs and/or comprises a series of computer instructions written in or implemented with any of a number of programming languages, as will be appreciated by those skilled in the art.

Referring to FIG. 1, system 100 in one example comprises one more instances of computing device 102. Computing device 102 in one example is a personal computer. In another example computing device 102 could be a workstation, a file server, a mainframe, a personal digital assistant ("PDA"), a mobile telephone, or a combination of these devices. In the case of more than one instance of computing device 102, the multiple computing devices 102 are coupled together through network 104. Network 104 in one example is any network that provides the more than one computing devices 102 to communicate (e.g., a Local Area Network ("LAN"), a Wide Area Network ("WAN"), a wireless LAN, a wireless WAN, the Internet, a wireless telephone network, etc.) In a further example, network 104 comprises a combination of the above mentioned networks. Computing device 102 can be connected to network 104 through landline (e.g., T1, DSL, Cable, POTS) or wireless technology, such as that found on mobile telephones and PDA devices.

Referring still to FIG. 1, in one example, a software component 106 resides on server 108. User 110 accesses software component 106 over network 104 (which in this case is the Internet) through employment of web browser 108 residing on desktop computer 112. In another example (not shown), software component 106 could reside entirely as a stand alone program on desktop computer 112. User 110 would then access and utilize component 106 without necessarily having to connect with another computing device 102 over network 104. In a further example, software component 106 is divided to reside on a multiple instances of computing device 102, which are connected to network 104. In this example, the multiple instances of computing devices 102 work cooperatively to carry out the functions of software component 106.

An exemplary description of the operation of system 100 will now be provided for illustrative purposes.

Figure 2:
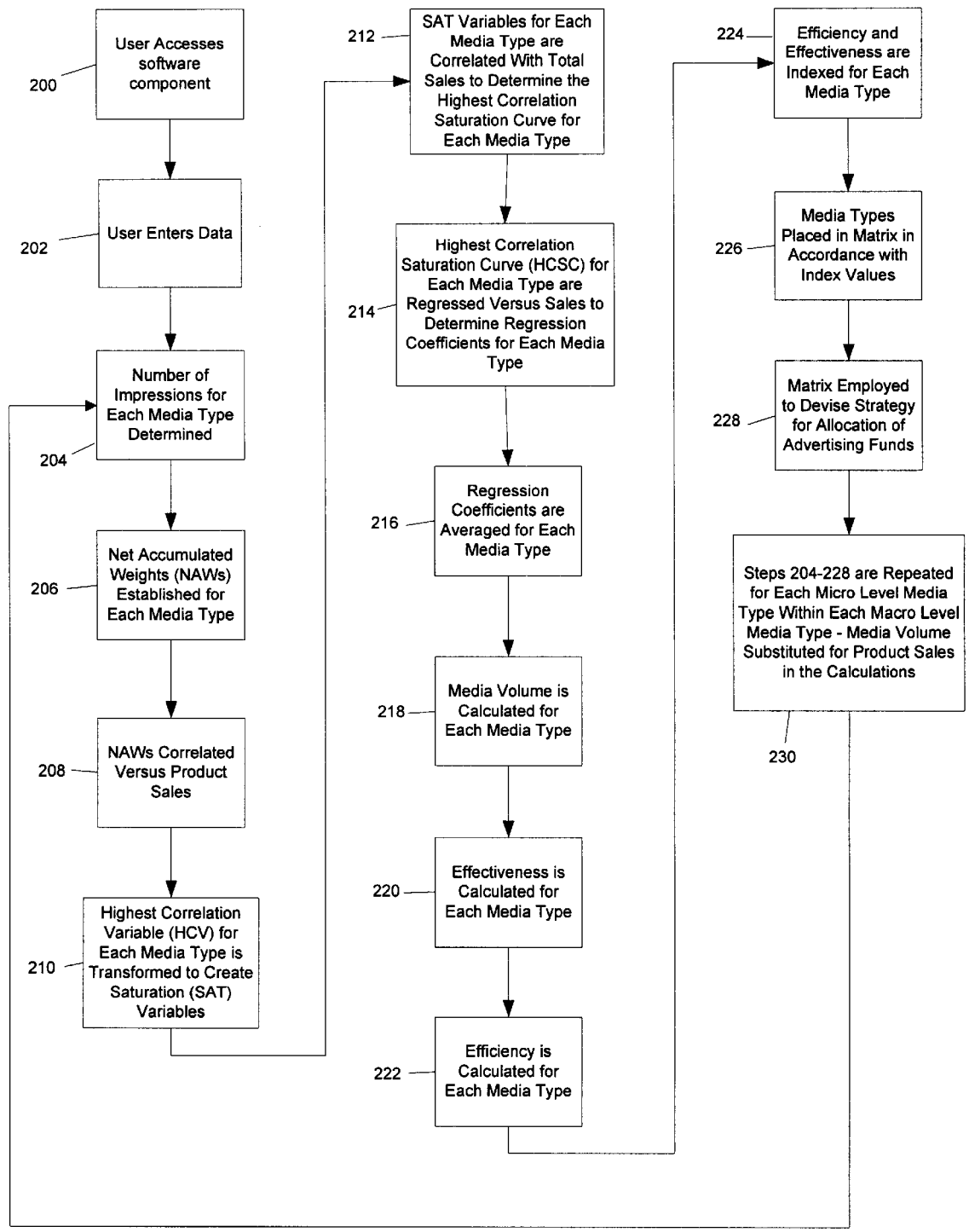
FIG. 2 is flow chart depicting exemplary operation of the system of FIG. 1.

Referring now to FIGS. 1 and 2, in step 200, user 110 accesses software component 106 over network 104 through utilization of desktop computer 112. In step 202, user 110 enters data into desktop computer 112 in response to one or more prompts. Software component 106 employs the data input by user 110 comprises information that program 106 employs to measure the effectiveness and efficiency of one or more types of macro level advertising media (e.g., television, radio, print, etc.). Software component 106 also measures the effectiveness and efficiency of each type of micro level media contained within macro level media. For instance, cable television, broadcast television, daytime television, and nighttime television are micro levels of media contained within the macro level media of television. Similarly, Sports and Classified news sections are micro levels of advertising contained within the macro level of newspaper. Effectiveness is defined as the amount of sales driven for each measured unit of advertising support. Efficiency is defined as the amount of sales driven for each dollar spent in advertising support.

The information provided in step 202 includes but is not limited to: The macro level types of advertising employed; the micro level types of advertising employed; the geographical area in which user 110 is directing the advertising; the product(s) and/or service(s) that the user is marketing; the time period in which the user wishes to measure the effectiveness and/or efficiency of the advertising; sales data for the product(s) and/or service(s); levels of advertising support in terms of Gross Ratings Points ("GRPs"); Impressions; dollars spent; pricing for the product(s) and/or service (s); and/or the seasonality of the product and/or services. This information is input into system 100 for each media type that user 110 wants to evaluate for a particular product or service. In one example, the information is provided on a weekly basis. It should be understood, however, that the user 110 could also enter data on a bi-weekly, monthly, daily basis, etc.

Once user 110 completes data entry in step 202, software component 106 performs a series of calculations to determine the effectiveness and efficiency of the different media. In the present example, these calculations are performed on a weekly basis (i.e., if user 110 inputs weekly data). It is envisioned, however, that the analysis could be performed daily, bi-weekly, monthly, etc. if user 110 so desired. To do so, the calculations described below would have to be adjusted to a different time scale, as would be within the purview of one of ordinary skill in the art.

In one example, the calculations begin, in step 204, with the component 106 using the input data to determine the number of impressions, or advertising viewings, for each form of advertising (e.g., television, radio, newspaper, etc.) for each product of interest. An impression is defined as the product of the number of people who have seen an advertisement multiplied by the number of times they've seen it. For example, if 10 people have seen an ad 5 times each, the number of impressions for that particular ad would be 50.

The number of impressions is calculated in step 204. One method for computing impression is through the use of Gross Rating Points (GRPs). A GRP is defined as the total number of impressions delivered by a media schedule expressed as a percentage of a market population. The GRPs for various advertising can be obtained from a media research organization, such as Nielsen Media Research, Inc. GRPs can be converted to impressions using the equation $$I = \frac{GRPs}{100} \cdot MP \qquad (1)$$

where I is the number of impressions, GRPs is the gross rating points, and MP is the market population. For example, if the total U.S. population is 270 million people, the number of impressions for 100 GRPs nationally would equal $$\frac{100}{100} \cdot 270 = 270 \text{ million impressions}$$

Stated differently, 100% of the U.S. population saw a given advertisement once, 50% of the population could have seen the advertisement twice, 25% of the population saw the advertisement four times, etc.

Alternatively, if user 110 had access to raw impressions data, or had an alternate way of calculating impressions, program 106 could prompt user 110 for the impressions data and step 204 could be skipped. Similarly, program 106 could calculate impressions using a different method.

After the number of impressions is calculated for each media type, in step 206 the number of impressions is used to establish a plurality of Net Accumulated Weights ("NAWs"), also called reduction rates, for each media type. It should be noted, however, that that NAWs can also be computer utilizing straight GRPs or advertising spending. Therefore, if impressions or GRPs are not available advertising spending can be used to calculate the NAWs. Advertising spending is defined as the cost of the ad paid to the media carrier (e.g. television network, radio station, etc.

In all, 95 NAWs are calculated for each advertising type input by user 110 (referred to herein as NAW01 to NAW95), as will be discussed herein. The NAWs are created using a Net Accumulated Weight adstock technique. The adstock (also known as retention rate or decay rate) is defined as the rate at which a consumer will retain an advertising message. For example, at a 90% adstock, a consumer will retain 90% of the previous week's media effect. The NAW for a given week is defined as $$NAW_w = AS_w + X \cdot NAW_{w-1} \qquad (2)$$

where $NAW_w$ is the NAW for the given week, $AS_w$ is the advertising support for the given week (advertising support is defined as GRPs, impressions, or spending depending on what the user inputs—at this stage, it will be either impressions or spending, GRPs would have been converted, as was described above, already). X is the adstock rate, and $NAW_{w-1}$ is the NAW for the previous week. The initial condition for $NAW_{w-1}$ is zero. Therefore, for week 1, $NAW_1$ will be equal to $AS_1$. In all ninety-five different NAWs are determined for each type of advertising. The ninety-five different NAWs are determined by varying X (the adstock) in equation 2 from 0.01 to 0.95 in steps of 0.01. Accordingly for week one, ninety five different NAWs will be calculated ($NAW01_1$ to $NAW95_1$) for each individual advertising type (i.e., television, radio, newspapers, etc.).

For example, if NAWs for a particular advertising type were calculated in week 5 of a campaign, employing equation (2) would result in the following relationships:

$$NAW01_5 = AS_{5+}(0.01)*AS_4 + (0.01)^2 AS_3 + (0.01)^3 AS_2 + (0.01)^4 AS_1$$

$$NAW02_5 = AS_{5+}(0.02)*AS_4 + (0.02)^2 AS_3 + (0.02)^3 AS_2 + (0.02)^4 AS_1$$

$$NAW03_5 = AS_{5+}(0.03)*AS_4 + (0.03)^2 AS_3 + (0.03)^3 AS_2 + (0.03)^4 AS_1$$

$$\ldots$$

$$NAW95_5 = AS_{5+}(0.95)*AS_4 + (0.95)^2 AS_3 + (0.95)^3 AS_2 + (0.95)^4 AS_1$$

After the NAWs for each media type are calculated, they are then correlated versus total product sales for the product or service in question in step 208. The highest correlation variable ("HCV") for each media type is then transformed, in step 210, using 5 specific saturation curve transformations to create 5 saturation curve ("SAT") variables. The HCV is the NAW with the highest correlation to sales. For example, if for TV, NAW17 (NAW for the particular week that is calculated with an adstock of 0.17) has the highest correlation value with sales, then TV-NAW17 is transformed using the saturation curve transformations. The saturation curve variables represent the relationship between adding additional advertising support (in terms of GRPs, impressions, or spending) and the corresponding additional advertising effect expected.

Each SAT variable is calculated as $$SAT = 1 - e^{\frac{2.5 \cdot \text{Log}_{10}(.5)}{(HCV' \cdot Z)^{2.5}} HCV^{2.5}} \tag{3}$$

where HCV' is the 50$^{th}$ percentile of the highest correlation variable from step 208. Z equals 80%, 100%, 120%, 140% and 160% for each of the respective curves (representing very high, high, medium, low, very low saturation, respectively).

Once the five SAT variables are calculated, they are each correlated with the total sales of the product or service in step 212. The highest correlation saturation curve ("HCSC") for each type of media is then regressed versus sales in step 214. The regression technique used in one example is an ordinary least squares regression technique. The regression analysis in step 214 is performed on: (1) the basis of sales, and (2) with saturation curves for other macro level media. If necessary, seasonality and pricing variables may be used in these regressions to account for the fluctuation of product sales due to reoccurring factors throughout the year (e.g., temperature or holidays) and the price paid by the consumer or the price paid to the manufacturer by the selling trade for a particular time period.

For example, if three macro level media types (e.g., television, radio and newspapers) are analyzed, and if television is the macro level having with the largest HCSC, a regression analysis is performed between $HCSC_{tv}$ (the highest correlated saturation curve for television) and total product sales. Such an analysis would generate a first coefficient represented here as "A."

Once the first coefficient is determined, component 106 then performs a regression analysis between the $HCSC_{rad}$ (the highest correlation curve for radio, which is the second highest macro level of advertising) versus total sales. Such an analysis would generate a second coefficient represented here as "B." Following the completion of that regression analysis, the system would perform a third regression analysis using $HCSC_{nw}$ (the highest correlation curve for newspapers, which is the remaining macro level of advertising) versus total sales to determine a third coefficient represented here as "C." Finally, a fourth regression analysis is performed using ($HCSC_{tv}+HCSC_{rad}+HCSC_{nw}$) versus sales (In other words, this further correlation occurs using the highest television curve, the highest radio curve, and the highest newspaper curve added together as variables, not as a sum, versus sales). This regression analysis results in three coefficients $D_1$, $D_2$, and $D_3$.

Having determined the regression coefficients, the program 106 averages the coefficients for each macro level media type in step 216. For example, the program 106 averages coefficients A and $D_1$ for television, B and $D_2$ for radio, and C and $D_3$ for newspapers. The three averages are used to calculate volume due to each macro level media, sales per impression and sales per dollar spent.

Media volume ("MV") is calculated, in step 218, using the following equation:

$$MV = c \cdot w \tag{4}$$

where c is the average of the coefficients for each macro level media type, and w is the weekly value of the HCSC (i.e., the variable that produced the highest coefficient value in the regression against sales, but on a weekly basis instead of its average). Media volume is later used to calculate effectiveness and efficiency for micro levels of media, as will be described herein.

Effectiveness is calculated, in step 220, as $$\frac{c \cdot v}{t} \cdot 1,000,00 \tag{5}$$

where v is the average of the most highly correlated saturation curve (i.e., the variable that gave us the coefficient value in the regression against sales) and t is the average of impressions (i.e., the original variable used to calculate the 95 NAWs for the first correlation) over the period of interest (in this case the number of weeks for which this analysis is calculated).

Following the calculation of effectiveness, sales per dollar spent (i.e., efficiency) is calculated, in step 222, using the equation:

$$\frac{\text{Effectiveness} \cdot t}{d} \cdot 1,000,000 \tag{6}$$

where t=average of impressions over the period of interest], d is the total media cost or spending summed across the total time series provided by user 110 in step 202, it is also called advertising spending).

The effectiveness and efficiency for each media type are then indexed in step 224. The indexing for effectiveness is achieved by dividing each effectiveness value by the maximum effectiveness value achieved by all media types and multiplying by 100. Similarly, the indexing for efficiency is achieved by dividing each efficiency value by the maximum efficiency value achieved by all media types and multiplying by 100. For example, three media types having (e.g., television, radio and print) effectiveness ratings of 42, 65 and 16, respectively would be indexed by dividing each effectiveness rating by the maximum effectiveness rating achieved, which in this case is 65. Accordingly, television would be indexed at 65% (42/65*100), radio would be at 100% (65/65*100) and newspapers would be at 25% (16/65*100). Similarly, if television, radio, and print had efficiency ratings of 42, 65, and 16, respectively, their respective efficiency ratings would be 65, 100, 25.

Figure 3:
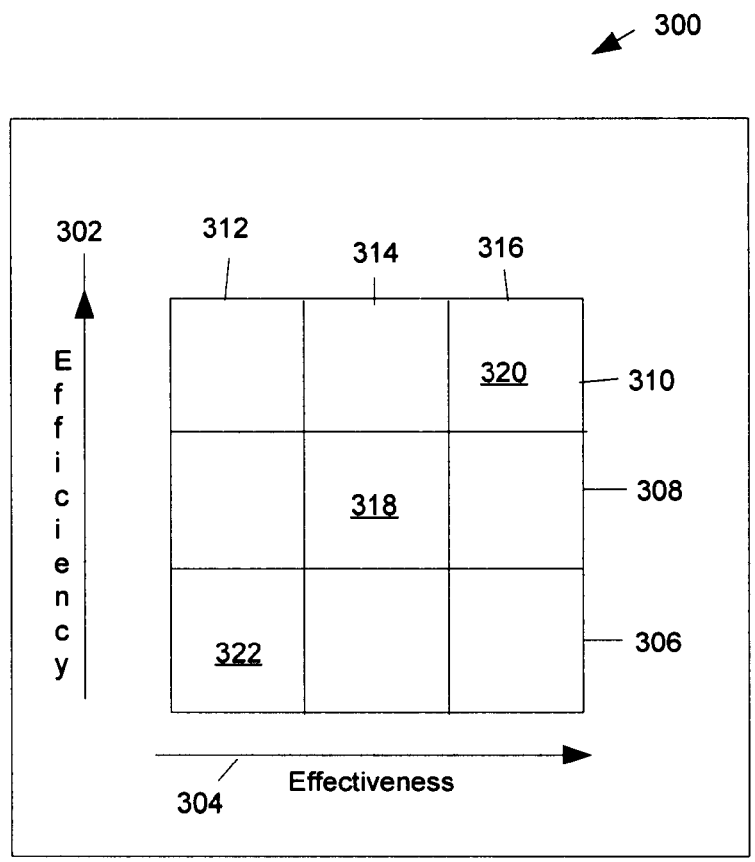
FIG. 3 is a matrix employed in the method of FIG. 2 for devising a strategy for allocation of advertising funds based on effectiveness and efficiency indexes of various advertising media.

Referring now to FIGS. 2 and 3, after indexing, the particular media types are placed in matrix 300 in step 226. Matrix 300 has a one axis 302 representing efficiency and another axis 304 representing effectiveness. The first row 306 represents a "low" efficiency index. Second row 308 represents a "medium" efficiency index, and third row 310 represents a "high" efficiency index. Similarly, first column 312 represents a "low" effectiveness index, second column 314 represents a "medium" effectiveness index, and third column 316 represents a "high" effectiveness index. In one example, the media types are placed in matrix 300 based on the following rules:

$$\text{low} \leq 33\% \qquad (7)$$

$$33\% < \text{medium} < 66\% \qquad (8)$$

$$\text{high} \geq 66\%. \qquad (9)$$

Thus television would be placed in the box 318 which is in the medium category for both effectiveness and efficiency; radio would be placed in box 320 which is in the high category for effectiveness and efficiency, and print would be placed in box 322 which is in the low category for effectiveness and efficiency.

Referring still to FIGS. 2 and 3, in step 228, user 110 employs matrix 300 to devise a strategy for allocation of advertising funds. For example, one strategy could be to shift funds from less efficient and less effective forms of media (i.e., the bottom left portion of matrix 300) to more efficient and more effective forms of media (i.e., upper right portion of matrix 300). This would entail shifting spending to media types located up and to the right on the matrix. If on the other hand, shifting spending up and to the right is not possible, perhaps because no advertising type occupies a space in this direction, spending could be shifted up. Finally, if shifting spending up is not possible, then spending should be shifted to the right.

These strategies are provided for illustrative purposes only and are not meant to limit the scope of this application. The particular strategy that any particular user employs would depend heavily on the user's business and marketing needs. For instance, a user may want to shift spending up and to the left to improve efficiency, as signified by cuts in media spending. In contrast, a user may want to shift spending to the right and down if they want to place a greater priority on share/volume rather than return on investment.

Referring now to FIG. 2, in step 230, once the volume due to each macro level type of advertising is determined, the efficiency and effectiveness indexes are created for each micro level of advertising. This involves repeating steps 204 to 228 for each micro level type of advertising contained within each macro level. As was explained earlier micro levels of advertising are, for example, the various newspapers in which the macro level of newspaper advertising is conducted, or the different types of television programming (e.g., sports, news, entertainment) in which the macro level of television advertising is placed. In essence, micro level advertising refers to any category within a macro level of advertising. Moreover, it should be noted that macro level advertising does not necessarily need to be various different types of media. In one example, the macro levels could include cable television, syndicate, and spot television. Examples of micro levels would then be daypart within cable, daypart within syndicate, and daypart within spot. It should also be noted that in performing the micro level analysis the same process with one exception (e.g., correlations, regression, etc.) is used to determine the micro level indexes as is used to determine the macro level indexes. The exception is that for the micro levels analysis, the media volume (equation 4) for each macro level is used as a substitute for sales to carry out the above correlations, regressions, etc.

In another example, system 100 uses the average coefficients obtained from the regressions described above and compares those coefficients against a future or simulated advertising plan to develop a score that would tell a user whether or not proposed changes to an advertising plan would result in better overall product sales.

Using these efficiency grades in conjunction with the corresponding media cost or spending, a media "score" is calculated by weight averaging the media "grades" by the media cost/spending. For example, assuming a current advertising plan utilizes two types of media, hereinafter referred to as Media A and Media B, and has the following characteristics:

Media A
low efficiency
assigned a grade of 16
current costs/spending=$1,000,000.
Media B
high efficiency
assigned a grade of 82
current cost/spending of $3,000,000.

$$\text{The current plan score} = \frac{(Grade_A \cdot Cost_A) + (Grade_B \cdot Cost_B)}{Cost_A + Cost_B} \qquad (10)$$

$$= \frac{(16 \cdot 1,000,000) + (82 \cdot 3,000,000)}{1,000,000 + 3,000,000}$$

$$= 65.5$$

This process is completed for the current media plan (using current media cost/spending). User 110 then inputs a future or projected media plan in terms of media used, projected media spending and levels of support. The HCSC calculated for the current media plan for each type of advertising is applied to future spending for that media to derive a "revised" media spending. This revised media spending is the spending used throughout the rest of this process for the future/projected media plan. The revised media spending is the projected media spending, entered above, adjusted by the HCSC to take media saturation into account (i.e., the point at which no measurable effect will occur for an increase in media spending Once the future/projected plan is input and the analysis on the current media plan has been completed, a "score" can be generated for both the current media plan and the future/projected media plan by using equation (10). The scores of the two plans are then compared and the percent sales improvement of the future/projected plan versus the current plan is calculated as $$\frac{(Score_f - Score_c)}{Score_c} \quad (11)$$

where $Score_f$ is the future media plan score and $Score_c$ is the current media plan score. An example is now provided for illustrative purposes.

Media Analyzed

Macro Level: Television and Radio
Micro Level A: Brand Television and Event Television
Micro Level B Media: Primetime Television and Daytime Television Current Plan Spending Television: $5,000,000
  Brand=$2,000,000
  Event=$3,000,000
  Primetime=$3,500,000
  Daytime=$1,500,000
Radio: $2,000,000

Media Grades

Television: High (82)
  Brand=Low (16)
  Event=High (82)
  Primetime=Medium (49)
  Daytime=High (82)
Radio: Low (16)

Current Plan Scores (Equation 10)

Macro Level=63
Micro Level A=56
Micro Level B=59
Future Plan Spending

Television=$6,000,000
  Brand=$1,500,000
  Event=$4,500,000
  Primetime=$3,000,000
  Daytime=$3,000,000
Radio=$1,000,000

Future Plan Micro Level Scores (Equation 10)

Micro Level A=66
  Improvement=(66−56)/56=17.8%
Micro Level B=66
  Improvement=(66−59)/59=11.2[{]ps This process is completed at the micro level prior to the macro level. The micro level results may then be used to adjust the macro level media grades. The macro level efficiency improvement is then calculated by repeating the same steps in the same manner as the micro level just described.

Future Plan Macro Level Scores
Television Improvement from Micro Levels:

Micro Level A = Current Macro Level Score ∗
  (1 + Micro Level A Improvement)
  = 82 ∗ (1 + 0.178)
  = 96.6

Micro Level B = Adj. Current Macro Level Score ∗
  (1 + Micro Level B Improvement)
  = 96.6 ∗ (1 + 0.112)
  = 107.4

Therefore, the new television score is 107.4
Final Future Plan Improvement

Macro Level = (6,000,000 ∗ 107.4) + (1,000,000 ∗ 16) /
  (6,000,000 + 1,000,000)
  = 94

Improvement=(94−63)/63=49.4%

While the principles of the invention have been shown and described in connection with the examples provided herein, such examples are for illustrative purposes only, and in now way should be construed as limiting the scope of the following claims.

What is claimed is:

1. A method for determining the effect of an advertisement on profits generated by sales of a product advertised in a given market area over a particular period of time, the method comprising utilizing a computing device to perform the steps of:

compiling a total of the number of impressions an advertisement makes on a plurality of potential customers through at least one specific form of advertising;

establishing at least one reduction rate for each of the total number of impressions for the at least one specific form of advertising;

correlating the at least one reduction rate for the at least one specific form of advertising with product sales;

determining at least one correlation variable for the at least one specific form of advertising;

calculating at least one saturation curve variable for the at least one specific form of advertising;

correlating the at least one saturation curve variable with product sales;

determining a first regression coefficient for the at least one specific form of advertising;

determining a second regression coefficient for the at least one specific form of advertising;

averaging the first and second regression coefficients for the at least one specific form of advertising to obtain an average coefficient for the at least one specific form of advertising; and calculating the product sales per impression using the average coefficient for the at least one specific form of advertising.

2. The method of claim 1 wherein:

the compiling step is comprised of compiling a total number of impressions that an advertisement makes on a plurality of potential customers for each specific form of advertising in a series of specific forms of advertising;

the establishing step is comprised of establishing a series of reduction rates for each of the total number of impressions for each specific form of advertising in a series of specific forms of advertising;

the series of reduction rates are correlated with product sales;

the step of calculating at least one saturation curve variable is comprised of calculating a series of saturation curve variables for each of a series of specific forms of advertising;

the correlating step is comprised of correlating the series of saturation curve variables for each of a series of specific forms of advertising with product sales;

determining the first regression coefficient is comprised of determining the first regression coefficient for each specific form of advertising by identifying a highest correlation saturation curve variable in the series of saturation curve variables for each of a series of specific forms of advertising and regressing the highest correlation saturation variable curve for each specific form of advertising versus product sales; and determining the second regression coefficient is comprised of regressing, in one regression, the highest correlation saturation curve for each specific form of advertising versus product sales.

3. The method of claim 1 further comprising calculating the product sales per dollar spent for each specific form of advertising.

4. The method of claim 1 wherein the at least one correlation variable is determined by correlating the at least one reduction rate versus product sales.

5. The method of claim 1 wherein the at least one saturation curve variable is calculated by transforming at least one correlation variable with at least one saturation curve transformation.

6. The method of claim 5 wherein the at least one correlation variable is the highest correlation variable.

7. The method of claim 1 wherein the first regression coefficient is determined by performing a first regression analysis on the at least one saturation curve variable for the at least one specific form of advertising.

8. The method of claim 7 wherein the first regression analysis is performed using an ordinary least squares regression technique.

9. The method of claim 1 wherein an overall highest correlation curve is the total of the highest of the at least one correlation curve for each specific form of advertising.

10. The method of claim 1 wherein the second regression coefficient is determined by performing a second regression analysis on an overall highest saturation curve versus product sales.

11. The method of claim 1 wherein the at least one specific form of advertising is comprised of the group comprised of television, radio and print media.

12. A data processing system for determining the effect of an advertisement on profits generated by sales of a product advertised in a given market area over a particular period of time, the data processing system comprising an effectiveness and efficiency calculation component in a processor that calculates a total of the number of impressions the advertisement makes on a plurality of potential customers through at least one specific form of advertising, establishes a reduction rate for each of the total number of impressions for the at least one specific form of advertising, determines at least one correlation variable for the at least one specific form of advertising, calculates at least one saturation curve variable for the at least one specific form of advertising, correlates the at least one saturation curve variable with product sales, determines a first regression coefficient for the at least one specific form of advertising, calculates an overall highest correlation curve, determines a second regression coefficient, averages the first and second regression coefficients for each specific form of advertising to obtain an average coefficient for each specific form of advertising, and calculates the product sales per impression using the average coefficient for each specific form of advertising; and an output device that outputs the product sales per impression to a user such that the user can employ the product sales per impression to allocate advertising funds.

13. The data processing system of claim 12 wherein the output device is a monitor that displays the calculated total number of product sales resulting from the advertising impression.

14. The data processing system of claim 12 wherein the output device is a printer that generates a print-out of the calculated total number of product sales resulting from the advertising impression.

15. The data processing system of claim 12 wherein the effectiveness and efficiency component calculates in the processor the product sales per dollar spent for each specific form of advertising.

16. A computer-readable medium having computer-executable instructions for performing a method comprising:

compiling a total number of impressions an advertisement makes on a plurality of potential customers through at least one specific form of advertising;

establishing a reduction rate for each of the total number of impressions for the at least one specific form of advertising;

determining at least one correlation variable for the at least one specific form of advertising;

calculating at least one saturation curve variable for the at least one specific form of advertising;

correlating the at least one saturation curve variable with product sales;

determining a first regression coefficient for the at least one specific form of advertising;

determining a second regression coefficient;

averaging the first and second regression coefficients for each specific form of advertising to obtain an average coefficient for each specific form of advertising; and calculating the product sales per impression using the average coefficient for each specific form of advertising.

17. The computer-readable medium of claim 16 wherein the compiling step is comprised of compiling a total number of impressions that an advertisement makes on a plurality of potential customers for each specific form of advertising in a series of specific forms of advertising;

the establishing step is comprised of establishing a series of reduction rates for each of the total number of impressions for each specific form of advertising in a series of specific forms of advertising;

the series of reduction rates are correlated with product sales;

the step of calculating at least one saturation curve variable is comprised of calculating a series of saturation curve variables for each of a series of specific forms of advertising;

the correlating step is comprised of correlating the series of saturation curve variables for each of a series of specific forms of advertising with product sales;

determining the first regression coefficient is comprised of determining the first regression coefficient for each specific form of advertising by identifying a highest correlation saturation curve variable in the series of saturation curve variables for each of a series of specific forms of advertising and regressing the highest correlation saturation variable curve for each specific form of advertising versus product sales; and determining the second regression coefficient is comprised of regressing, in one regression, the highest correlation saturation curve for each specific form of advertising versus product sales.

18. The computer-readable medium of claim 16 wherein the at least one correlation variable is determined by correlating the at least one reduction rate versus product sales.

19. The computer-readable medium of claim 16 wherein the at least one saturation curve variable is calculated by transforming at least one correlation variable with at least one saturation curve transformation.

20. The computer-readable medium of claim 19 wherein the at least one correlation variable is the highest correlation variable.

21. The computer-readable medium of claim 19 wherein the first regression coefficient is determined by performing a first regression analysis on the at least one saturation curve variable for the at least one specific form of advertising.

22. The computer-readable medium of claim 21 wherein the first regression analysis is performed using an ordinary least squares regression technique.

23. The computer-readable medium of claim 16 wherein the overall highest correlation curve is the total of the highest of the at least one correlation curve for each specific form of advertising.

24. The computer-readable medium of claim 16 wherein the second regression coefficient is determined by performing a second regression analysis on the overall highest saturation curve versus product sales.

25. The computer-readable medium of claim 16 wherein the at least one specific form of advertising is comprised of the group comprised of television, radio and print media.

* * * * *